Sept. 18, 1934.    F. C. KIMMEL    1,974,360
PORTABLE ELECTRIC HEATING AND COOKING UTENSIL
Filed Nov. 28, 1931    3 Sheets-Sheet 1
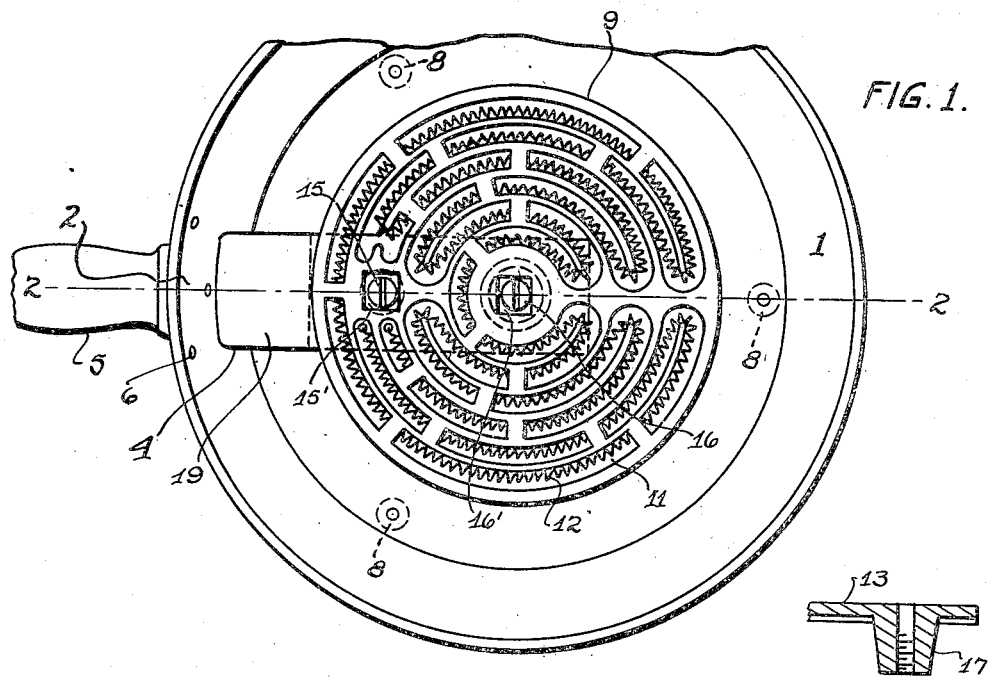
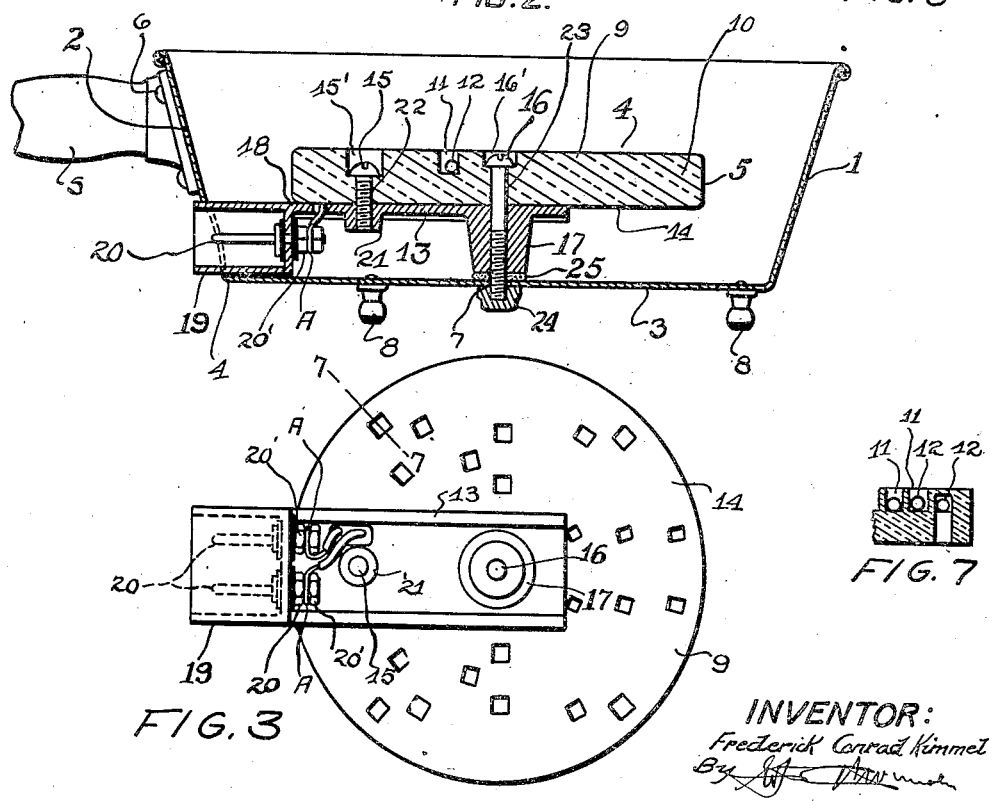
INVENTOR:
Frederick Conrad Kimmel
By
his Attorney Sept. 18, 1934.   F. C. KIMMEL   1,974,360
PORTABLE ELECTRIC HEATING AND COOKING UTENSIL
Filed Nov. 28, 1931   3 Sheets-Sheet 2
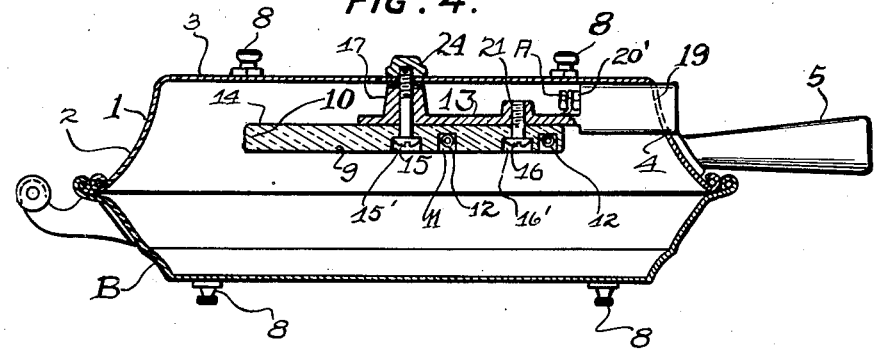
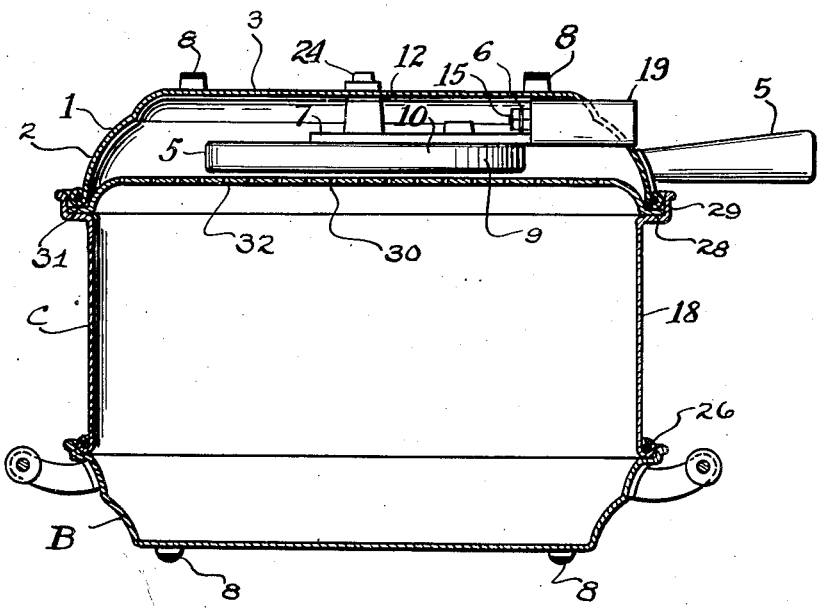
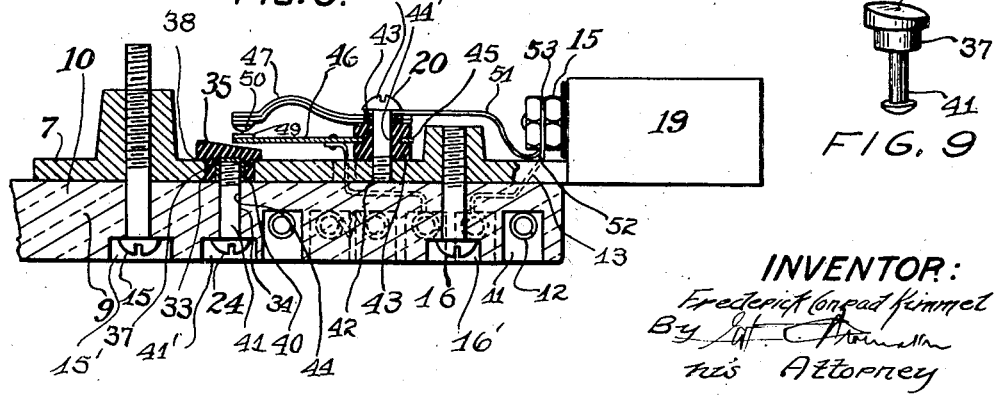

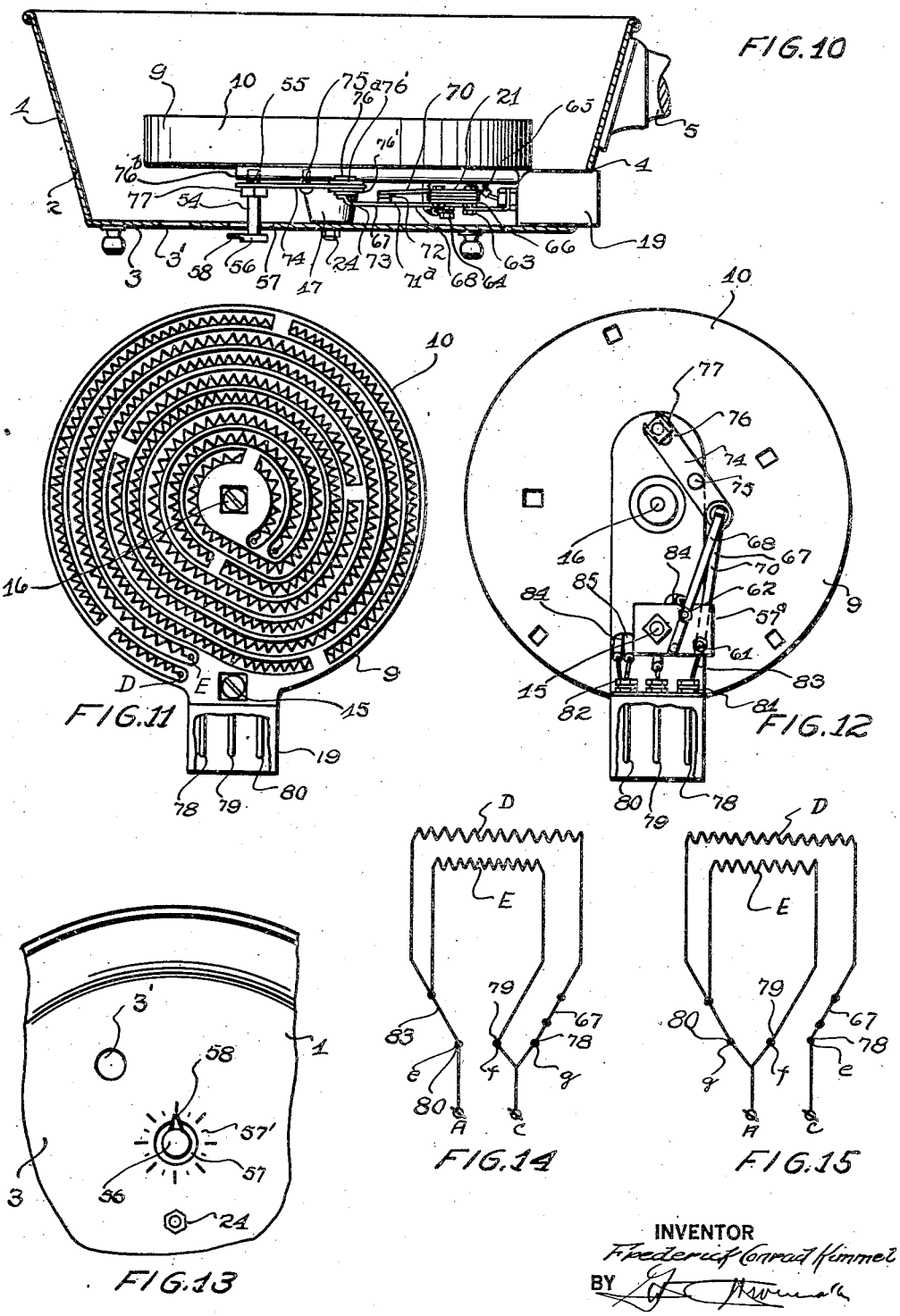
Sept. 18, 1934.  F. C. KIMMEL  1,974,360
PORTABLE ELECTRIC HEATING AND COOKING UTENSIL
Filed Nov. 28, 1931  3 Sheets-Sheet 3
INVENTOR
Frederick Conrad Kimmel
BY
His ATTORNEY Patented Sept. 18, 1934

1,974,360

UNITED STATES PATENT OFFICE 1,974,360

PORTABLE ELECTRIC HEATING AND COOKING UTENSIL

Frederick Conrad Kimmel, Rochester, N. Y., assignor to Frederick Henry Kimmel, Rochester, N. Y.

Application November 28, 1931, Serial No. 577,809

12 Claims. (Cl. 219—44)

This invention relates to portable electric heating and cooking utensils.

The purpose of the invention is to provide a portable electric heating and cooking utensil for broiling all kinds of meat, fish and fowl and which may be also used as a toaster for bread and the like, boiling purposes, or as a heater for any other purpose. By providing a utensil in accordance with my invention foods may be broiled etc. without odor and in considerably less time than other ways of cooking and broiling foods etc.

One object of the invention is to provide portable heating and broiling utensils which are simple in construction and inexpensive to manufacture yet permitting of long and satisfactory use.

Another object of the invention is to provide portable electric heating and broiling utensils of such construction and arrangement of parts so as to permit ready insertion and removal of the electric heating unit in the event the unit has become damaged or burned out by removing or replacing a single fastener means.

A further object of the invention is to provide utensils of this character having automatic means to control the heat within the same and, in some cases, to have means to regulate the automatic means for controlling the amount of heat within the utensil.

A still further object of the invention is to provide utensils of this character whereby, in some instances, the utensil is used as a cover for a tray, dish or the like upon which is food to be heated or cooked, or the cover may be placed over the top of a relatively deep pan, and in other instances the utensil being adapted for use as a receptacle to receive a kettle or the like therein, which is supported on the heating unit to produce boiling etc.

Like reference numbers in the several views of the drawings denote the same parts.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

The invention will be more readily understood by referring to the drawings in which Fig. 1 is a top plan view partly broken away.

Fig. 2 is a vertical sectional view on the lines 2—2 of Fig. 1.

Fig. 3 is a bottom plan view of the heating unit with the electrical connector attached thereto removed from the utensil.

Fig. 4 is a sectional view showing the portable utensil used as a cover on the top of a tray.

Fig. 5 is a sectional view showing the portable utensil used as a cover on the top of a relatively deep pan.

Fig. 6 is a sectional view partly broken away and showing a modification of the heating unit with its attached parts.

Fig. 7 is a sectional view on the lines 7—7 of Fig. 3.

Fig. 8 is a fragmentary sectional view of the threaded boss.

Fig. 9 is a perspective view of the cam adjustment member.

Fig. 10 is a modification of the invention showing the utensil in section and the heating unit and its attached parts in full lines.

Fig. 11 is a top plan view of the heating unit removed from the utensil.

Fig. 12 is a bottom plan view of the heating unit and its attached parts removed from the utensil.

Fig. 13 is a fragmentary plan view showing the under side of the utensil and the regulator knob and dial; and Figs. 14 and 15 are wiring diagrams of the invention as disclosed in Figs. 10, 11 and 12.

In the drawings the portable utensil is shown at 1. This utensil is pan-shaped and consists of side walls 2 and a bottom 3. One of the side walls is provided with an opening 4 adjacent the bottom 3 of the utensil. A suitable handle 5 is secured to the side wall of the pan-shaped member by rivets or the like as at 6. The bottom portion 3 of the pan-shaped member is provided preferably at its center with an opening 7 and there is also provided on the exterior bottom portion 3 suitable supports in the form of feet 8. The feet 8 are insulated as shown at 8', which will prevent marring of table tops and the like upon which the utensil is placed. Suitable vent openings 3' are also provided in the bottom portion 3. Any number of these vent openings might be used.

Arranged within the pan-shaped member 1 is an electrical heating member 9. This heating member consists of a plate 10 composed of insulating material and preferably circular in outline and is provided on its front face with a series of concentric relatively deep grooves 11. In the grooves 11 there are positioned electric heating resistance wires 12, in the form of coils, such wires or coils being below the plane surface of the plate. A relatively long, narrow arm 13 is secured to the rear face 14 of the plate 10 by means of suitable screws 15 and 16. The face of the plate 10 is provided with recesses 15' and 16' for the reception of the heads of the screws 15 and 16 respectively, so that the heads of these screws are below the plane of the face of the plate 10. Adjacent the inner end of the arm 13 there is provided, and preferably integral therewith, an interiorly threaded boss 17. The outer end 18 of the arm terminates into an electrical connector 19 which is in the form of a tubular socket and contains the connector prongs 20. The connector prongs 20 extend through the closed end of the socket and are provided with suitable securing means 20' in the form of nuts for securing the electrical conductor wires "A". Intermediate of the interiorly threaded boss 17 and the connector socket 19 there is provided another and preferably smaller interiorly threaded boss 21, also preferably integral with the arm 13. The screw 15 extends through an opening 22 in the plate 10 and engages the screw threads in the threaded boss 21 and the screw 16 extends through an opening 23 in the plate 10 and engages the screw threads of the boss 17. In this manner the arm 13 carrying the bosses 17 and 21 and the connector socket 19 is secured to the bottom face 14 of the plate 10 and these elements then constitute a single removable and replaceable unit. The screw 16, as before stated, extends through the opening 23 in the plate 10 and is in engagement with the screw threads of the boss 17 and the threaded end of the screw projects beyond the end of the boss 17 as shown in Figs. 2, 4 and 6, and is adapted when the connector socket 19 has been inserted in the opening 4 to extend through the opening 7 in the bottom 3 of the utensil. The threaded end of the screw 16 is adapted to receive a securing means 24 in the form of a nut. A suitable washer 25 having an opening which surrounds the screw 16 may be provided intermediate the boss 17 on the inside of the bottom 3 of the utensil.

Therefore, it will be seen that by removing the securing means 24, which is in the form of a nut, the heating unit carrying the arm and connector socket therewith is removable from the utensil. In other words, the securing means 24 constitutes a single means of fastening or securing the heating unit within the utensil.

In Fig. 4 the utensil or pan-shaped member 1 is shown as covering a tray "B". The tray "B" may also be provided with supports 8 in the form of feet. It is understood that the tray is to contain food or the like which is to be heated or cooked. The aforementioned description of parts applies to this figure, and one of the various uses of the utensil is disclosed herein.

In Fig. 5 a cooking utensil which is preferably used for broiling roasts of meat, fowl etc. is shown. The portable electrical heating or cooking utensil or pan-shaped member 1 is shown as covering a spacing member "C" and the tray is shown at "B". The spacing member "C" is preferably cylindrical and has its bottom end curled as at 26. At the upper end of the side wall 27 there is provided a flange 28 extending horizontally outwardly from the side walls 27 of the member "C" and the outer end of the flange 28 extends vertically upwardly as at 29. The formation of the upper end of the spacing member "C" provides a circumferential horizontal seat around its entire upper end. In some instances it is desirable to use a protector for the heating element 9. This protector may be of concavo-convex formation as shown at 30 and having a flanged end 31. The flanged end 31, of course, extends circumferentially of the concavo-convex member 30 and rests on the seat 28. The pan-shaped member or utensil 1 is shown placed over the top of the flange 31 and is supported thereon. The concavo-convex protector 30 may be perforated as at 32, if desired. By forming a cooking device in accordance with the invention as disclosed in Fig. 5, as before stated, the broiling of large portions of meat or fowls etc. may be readily accomplished. Of course, there are other uses to which this form of utensil is well adapted.

In the modification of the invention as disclosed in Fig. 6 of the drawings, the heating element 9 is attached to the arm 13 in the same manner as heretofore described. The arm 13 is provided with an opening 33 and the heating member 9 is provided with an opening 34. These two openings 33 and 34 are adapted to register when the arm 13 has been secured to the heating element 9 as aforedescribed. A cam 35 provided with a cam face 36 at its upper portion and terminating into a reduced hollow sleeve 37 is adapted to be rotatively mounted in the opening 33 of the arm 13. The upper enlarged portion of the cam 35 is adapted to rest on the under side of the arm 13 as shown at 38. The cam 35 is constructed of insulating material and has secured in the hollow portion 39 a screw threaded metallic ferrule 40. A screw 41 is adapted to be inserted in the opening 44 in the heating member 9 and the heating member 9 is provided with a recessed portion 41' to receive the head of the screw. The other end of the screw 41 is provided with screw threads which are adapted to engage the screw threads of the metal ferrule 40 and rotation of the cam is accomplished by turning the screw 41. Adjacent the cam 35 the arm 13 is provided with a screw threaded opening 42. Arranged over the opening 42 there is provided a block of insulating material 43 which is provided with a central aperture 44'. Secured to the block in any suitable manner as at 45 is one member of a circuit maker and breaker 46. On top of the insulating block 43 there is provided the other member of the circuit maker and breaker 47 which is attached to the top of the block 43 by means of a screw 48 which extends through the member 47 and through the opening 44' in the block and into the screw threads in the opening 42 in the arm 13. The member 47 of the circuit maker and breaker is in the form of a conventional thermostat which consists of a laminated structure of two metals of different coefficients of expansion. The portion 36 of the circuit maker and breaker is provided with a contact at its end as shown at 49 and the thermostatic member 47 of the circuit maker and breaker is provided at its end with a contact as at 50. The member 46 of the circuit maker and breaker extends from its point of connection to a point directly above the cam 35 as also does the thermostatic member of the circuit maker and breaker 47. The contacts 49 and 50 are normally in engagement with each other and the circuit from the socket connector 19 extends from the conductor wires 51 and 52 through the portion 47 of the circuit maker and breaker and through the portion 46 of the circuit maker and breaker and then into and through the heating resistance wires 12. When a predetermined temperature has been reached the thermostatic portion 47 of the circuit maker and breaker will curl or turn away from the contact 49 and break the circuit to the coils in the resistance wire. By turning the screw 41 it will be seen that the cam 35 will be rotated and can be brought into engagement with the member 46 of the circuit maker and breaker and thereby adjust the portion 46 so as to regulate the thermostat portion 47 to break the circuit at various temperatures. The conductor wires 51 and 52 are secured to the socket by means of suitable nuts or other fastenings 53.

In Fig. 10 a further modification of the invention is disclosed. It is to be understood that the plate 9 and the arm 13 which carries the interiorly threaded bosses 17 and 21 are secured to the utensil or pan-shaped member 1 in the same manner as hereinbefore described. That is, the connector socket 19 which is integral with the arm 13 is placed through the opening 4 in the side wall of the utensil or pan-shaped member 1 and the screw threaded extension of the screw 16 extends through an opening 7 in the bottom 3 of the utensil and then the securing means in the form of a nut 24 is attached to the end of the screw 16. A manually controlled regulator 54 which has one end screw threaded as at 55 and has a knurled knob 56 at its other or outer end, is mounted in a screw threaded opening in the arm 13. The knurled knob 56 extends through an opening 57 in the bottom 3 of the utensil 1 and is controllable exteriorly of the utensil. Suitable graduations 57' may be provided on the bottom 3 and the head 56 is preferably provided with a pointer 58. The screw 15 is screw threaded into the interiorly screw threaded boss 21 in the same manner as shown in Fig. 2 except that in the modification shown in Fig. 10 the screw threads of the screw extend below and exteriorly of the boss 21.

A plate 57ª is provided with a suitable opening and is mounted on the screw threaded extension on the screw 15 as shown in Fig. 12 and a securing means in the form of a nut 58 fastens the plate 57ª to the boss 21. This plate 57ª is preferably of rectangular formation and is provided with suitable openings which receive screws 61 and 62 respectively which form binding posts for the connector wires. The connector wires are held to such binding posts by suitable nuts 63 and 64. The plate 57ª is spaced by its mounting on the boss 21 from the bottom of the arm 13 and is preferably provided on its top and bottom with suitable insulations 65 and 66 respectively. Or, of course, the plate itself may be made of insulating material. The plate 57ª in addition to supporting the binding posts 61 and 62 also forms a support for an electrical circuit maker and breaker 67. One of the arms 68 of the circuit maker and breaker is provided with an opening and is placed around the binding posts 60 and has one end secured to the plate by means of a suitable screw 69. The other arm of the circuit maker and breaker 70 is secured to the other side of the plate and is held in engagement therewith by the binding post 61. The members 68 and 70 of the circuit maker and breaker are provided adjacent their free ends with contacts 71ª and 72 respectively. The free end of the arm 68 of the circuit maker and breaker is bent substantially at a right angle as at 73 and extends beyond the contacts 71ª and 72. A thermostat in the form of a narrow flat piece of metal 74 is secured to the arm 13 by means of a screw or like securing means 75 preferably at its center. One end of the thermostat 74 is cut away and is substantially U shaped, as shown at 76. The other end of the thermostat 74 is provided with a means in the form of an insulated rivet or the like 76ª. Suitable insulation in the form of mica disks 76' are provided adjacent the insulating means 76ª on the thermostat bar 74 at its top and bottom. The securing means 75 for the thermostat 74 permits of movement at both ends of the thermostat. The screw threaded end 55 of the regulator 54 extends between the substantially U shaped cut-out end of the thermostat 74 and is screw threaded into an interiorly screw threaded opening or recess 76ᵇ in the arm 13. The other end of the thermostat 74 and the insulating means 76 is normally in engagement with the end 73 of the portion 68 of the circuit maker and breaker and the contacts 71 and 72 of the circuit maker and breaker are normally in engagement with each other. It will be seen then that when a predetermined temperature has been reached the thermostat 74 will curl or turn away from the bottom of the plate 9 and in doing so, the portion 76 of the thermostat being in contact with the extension 73 on the arm 68 of the circuit maker and breaker, the circuit through the switch, will then be broken by the thermostat. It will further be seen that by turning the knurled knob 56 of the regulator 54 and the fact that the regulator is provided with an enlargement 77 which is in engagement with the U shaped end of the thermostat 74, and the thermostat being loosely mounted on the securing means 75, that an adjustment of the thermostat is accomplished, and which permits of the insulated end of the thermostat to be moved into and away from the extension 73 of the movable member 68 of the circuit maker and breaker, thereby providing for the breaking of the circuit to the resistance wires at various temperatures by means of regulating the thermostat 74.

In the modification as shown in Figs. 10 to 15 inclusive, the heating element 9 is, of course, provided with the grooves to receive the resistance heating wires, but in this modification there are provided two separate and distinct heating resistance wires. The outer or the longer of the two heating resistance wires is denoted by the letter "D" and the inner or shorter of the two resistance wires is denoted by the letter "E". As shown in Fig. 11 these wires are substantially in the form of a helix when placed in the grooves in the plate 9 and they both start at a point adjacent the connector socket 19 and extend substantially to the center of the heating element 9. In the modification of the invention as shown in Figs. 11 and 12 the connector socket 19 is shown as being provided with three terminals or prongs 78, 79 and 80. As shown in Fig. 12 these prongs 78, 79 and 80 are provided exteriorly of the closed end of the socket with screw threaded portions upon which suitable securing nuts 81 and conductor wire securing means in the form of nuts 82 are provided. Attached to one end of the prong 78 there is a conductor wire 83 which, in turn, is attached to the binding post 61 which carries one member 70 of the circuit maker and breaker 67. A conductor wire 84 is attached to the binding post 62 and extends through the bottom of the plate 9 to the long resistance heating coil "D". The prong 79 at its end has secured thereto by means of the nut 82 a conductor wire which terminates into the short resistance heating coil "E" and the prong 80 has secured thereto by means of the nut 82 two wires 84 and 85 which are the ends of the resisting heating wires "D" and "E" respectively.

By referring to the wiring diagrams as shown in Figs. 14 and 15 a clearer understanding of the heating and flow of current through the heating resistance wires "D" and "E" will be had. It is to be kept in mind that the purpose of the invention as disclosed in Figs. 10 to 15 inclusive is to provide a portable electric broiler, cooker etc., which may be regulated to reach various high degrees of temperatures and then by means of the thermostat 74 and switch 67 the temperature will automatically be lowered. Of course, the degree of temperature may be regulated by adjusting the regulator 54 by simply turning the knob 56 and having the pointer 58 directed to the temperature desired.

In the diagram shown in Fig. 14 the letters $e$, $f$ and $g$ denote the three terminals or sockets in an attachment plug to receive the prongs 78, 79 and 80 of the connector socket 19. The numerals 78, 79 and 80 indicate the prongs 78, 79 and 80 as shown in Figs. 11 and 12. By inserting an attachment plug with the sockets $e$, $f$ and $g$ over the prongs 78, 79 and 80, the incoming electric current will flow through the single wire 83 and through both of the electric heating resistance wires or coils D and E and, of course, then out through $f$ and $g$. In other words, with the attachment plug inserted as shown in the diagram Fig. 14, both of the resistance wires D and E are heated.

When it is desired to heat only the resistance heating wire or coil D, as shown in Fig. 15, the attachment plug carrying the sockets $e$, $f$ and $g$ is simply turned over and placed into the connector socket 19. In this manner the incoming electric current through the wire $e$ passes through the connector wire 83 through the switch 67, through the heating resistance wire coil D and then out through the wire $g$. It will be seen that, when the attachment plug is inserted, as before stated, the heating resistance wire E will not be heated by the incoming electric current.

It is clear then, that when the attachment plug is inserted in the socket 19 in accordance with the diagram shown in Fig. 14, the incoming electric current to the wire $e$ will pass through and heat both of the heating resistance wires D and E, will then be grounded through the wires $f$ and $g$ and, when the attachment plug is reversed or turned over in the socket 19 in accordance with the diagram shown in Fig. 15 the incoming electric current will flow only through and heat the heating resistance wire or coil "D".

In view of the above therefore, it will be seen that the invention consists of a novel arrangement of parts and is of simple, inexpensive construction. The ready removal and insertion of the heating unit which carries the connector socket is accomplished by simply removing a single securing means in the form of a nut which is exterior of the utensil. There are no wires or connections to be disconnected, and, as before stated, the removal and insertion in the event that the heating unit has become damaged or burned out is accomplished simply by the removal of a single nut which forms the securing means.

In the modifications of the invention the temperature is automatically controlled and, in one of the modifications, not only is the temperature automatically controlled but means is provided for regulating and controlling the temperature, and there is also means provided to bring into operation two heating resistance coils, or one of them may be disconnected from the circuit, all of which is accomplished by the insertion of an attachment plug in a particular manner in a connector socket which is attached to the heating unit, there being no wires to be connected or disconnected by the user.

While the invention has been described and is primarily used in the portable type of broilers, cookers, etc., it is to be understood and kept in mind that the particular heating unit might well be adapted for uses in stationary devices such as heaters, cooking stoves and the like.

What I claim as my invention and desire to secure by Letters Patent is:

1. A portable electric heating or cooking device comprising a cover having a flaring side wall adapted to be placed over a tray or the like upon which is food to be heated or cooked, a handle for the cover which extends substantially horizontally from the side wall of the cover, an electric heating element arranged within said cover, an electric tubular socket connector secured to said heating element and projecting outwardly through a side wall of the cover, adjacent the inner end of said handle and having its outer open end extending beyond the side wall of said cover for connection with a source of electric current.

2. A portable electric heating or cooking device comprising a cover having a mouth and adapted to be placed over a tray or the like upon which is food to be heated or cooked, an electric heating element within the cover, means for securing the heating element therein, an electric connector including an arm secured rigidly to said heating element and a socket rigidly carried by the arm at the outer end of the latter and extending exteriorly of said cover, the said means for securing the heating element being removable, whereby the heating element arm and the socket may be removed as a unit outwardly through the mouth of the cover from the cover as a unit.

3. An electric heating and cooking device comprising a pan-shaped member having an open mouth, a heating element, means for detachably securing the heating element within said member, an electric connector secured to said heating element and projecting through the side wall of the pan-shaped member and having an opening which opens outwardly exteriorly of said member, whereby upon removal of said detachable securing means, the electric heating element with the connector secured thereto may be removed as a single unit outwardly from the pan-shaped member through the mouth thereof in the event the heating element becomes damaged or burned out.

4. A portable electric heating or cooking device comprising a pan-shaped member including a side wall and a connecting wall and having an opening in the side wall, a substantially horizontally disposed handle connected to the side wall, a heating element within the pan-shaped member, a single element for securing the heating element in the pan-shaped member, an electrical conductor interposed between said connecting wall and the heating element and electrically connected with the latter and having a terminal projecting through the aforesaid opening in the side wall of the pan-shaped member whereby upon removal of said single fastening element the heating element and said conductor may be removed from the pan-shaped member outwardly through the mouth of the latter from between the side walls of the pan-shaped member.

5. A portable electric heating or cooking device comprising a pan-shaped member having a flaring side wall flaring outwardly to an open mouth and also having an opening in its side walls, a heating element within the member, a relatively long narrow arm secured to one face of the heating element and having one end projecting beyond the same, a short tubular socket formed at such projecting end of the arm and extending longitudinally thereof outwardly through said opening whereby an attachment plug may be placed therein exteriorly of the pan-shaped member, means on said arm for securing the arm to one face of the heating element, and means also on said arm for detachably securing the heating element and arm within said member, whereby upon removal of said detachable securing means the heating element with the arm and socket secured thereto may be removed as a unit outwardly through the mouth of the pan-shaped member in the event the heating element has become damaged or burned out.

6. A portable electric heating or cooking device comprising a pan-shaped member having a flaring side wall flaring outwardly to an open mouth and also having an opening in its side wall, a heating element within the member, a relatively long narrow arm secured to one face of the heating element and having one end projecting beyond the same, a short tubular socket formed at such projecting end of the arm and extending longitudinally thereof outwardly through said opening whereby an attachment plug may be placed therein exteriorly of the pan-shaped member, means on said arm for securing the arm to one face of the heating element, means also on said arm for detachably securing the heating element and arm within said member, whereby upon removal of said detachable securing means the heating element with the arm and socket secured thereto may be removed as a unit outwardly through the mouth of the pan-shaped member in the event the heating element has become damaged or burned out, thermostatic control means mounted on said arm, and means carried by the arm to regulate the thermostatic control.

7. As an article of manufacture, an electric heating element comprising a heating member carrying a heat resisting element, an arm secured to said member and projecting outwardly beyond the member, and a relatively short tubular socket formed at such projecting end and extending longitudinally therefrom to receive an attachment plug.

8. As an article of manufacture, an electric heating element comprising a heating member carrying a heat resisting element, a relatively long narrow arm secured to one face of the heating member and at one end projecting beyond the member, and a relatively short tubular socket formed at such projecting end and extending longitudinally therefrom to receive an attachment plug.

9. A portable electric heating or cooking device including a pan-like member usable as a cooking unit or as a cover for a utensil having a commodity therein to be cooked, including a relatively narrow side wall having an open mouth and a connecting wall forming a top or bottom wall depending upon whether the device is used for cooking purposes or as a cover for a cooking utensil, an electric heating element arranged within said member and spaced from said walls, an electric connector having connection with said heating element and arranged between the heating element and said connecting wall and extending exteriorly of the pan-like member through said side wall, and a single fastening means arranged centrally of the heating element to secure the same in operative relation with the pan-like member and whereby upon removal of the single fastening means the heating element may be removed from normal fixed operative relation with the pan-like member.

10. A portable electric heating or cooking device including a pan-like member including a top or bottom wall and side walls, an electric heating element arranged within said pan-like member in spaced relation to the top or bottom portion of the pan-like member to provide an interspace between the top or bottom of the pan-like member and the heating element, the pan-like member having a ventilating opening leading from said inner space, a screw bolt passing centrally through the top or bottom member and centrally through the heating element, a nut having working fit on said screw bolt whereby to secure the heating element in normal fixed operative relation to the pan member, and an electric attaching device having operative electrical connection with the heating element and extending exteriorly of the pan-like member.

11. As an article of manufacture, an electric heating element comprising a heating member carrying a heat resisting element, a separate arm detachably secured to one face of the heating member and at one end projecting outwardly beyond said member, and a relatively short socket formed at the projecting end of said arm and extending longitudinally therefrom in offset relation thereto to receive an attachment plug.

12. As an article of manufacture, an electric heating element comprising a heating member carrying a heat resisting element, a separate arm detachably secured to one face of the heating member and at one end projecting outwardly beyond said member, and a relatively short socket formed at the projecting end of said arm and extending longitudinally therefrom in offset relation thereto to receive an attachment plug, the inner end of the socket having connector prongs for cooperation with the attaching plug, said arm having an opening therein adjacent said socket for the passage of the terminals of the heat resisting element to said prongs of the socket.

FREDERICK CONRAD KIMMEL.